United States Patent [19]
Loomans

[11] 3,862,551
[45] Jan. 28, 1975

[54] DRIVE SHAFT CONSTRUCTION FOR MIXERS AND THE LIKE

[75] Inventor: Bernard A. Loomans, Saginaw, Mich.

[73] Assignee: Baker Perkins, Inc., Saginaw, Mich.

[22] Filed: Sept. 12, 1973

[21] Appl. No.: 396,443

[52] U.S. Cl.............................. 64/19, 64/6, 64/12, 64/21, 74/22, 403/59
[51] Int. Cl............................................. F16d 3/54
[58] Field of Search............ 64/19, 12, 6, 17, 23, 4, 64/20, 21; 403/59, 63; 74/22

[56] References Cited
UNITED STATES PATENTS

| | | | |
|---|---|---|---|
| 1,342,300 | 6/1920 | Sheler et al. | 64/19 |
| 2,137,179 | 11/1938 | Nelson | 64/21 |
| 3,263,447 | 8/1966 | Baker | 64/21 |
| 3,517,528 | 6/1970 | Eccher | 64/21 |
| 3,538,721 | 11/1970 | Reddy | 64/21 |

FOREIGN PATENTS OR APPLICATIONS

| | | | |
|---|---|---|---|
| 1,177,883 | 12/1958 | France | 64/21 |
| 1,276,758 | 10/1961 | France | 64/21 |

*Primary Examiner*—Samuel Scott
*Assistant Examiner*—Randall Heald
*Attorney, Agent, or Firm*—Learman & McCulloch

[57] ABSTRACT

A drive shaft construction, particularly for mixers wherein a mixer shaft is axially reciprocated as well as rotated, and wherein a coaxial driven shaft is provided opposite a drive shaft which is rotatably driven. A pair of pin mount pieces or surfaces which may be integral or attached, are provided on the sides of the drive shaft and a like pair of pin mount pieces are provided on the sides of the driven shaft and links, extending in planes at an equal spaced distance from the axis of rotation and reciprocation in an *x* coordinate direction, pivotally connect the mount pieces on the driven shaft with the mount pieces on the drive shaft at points spaced equally from the co-axis in a *y* coordinate direction. Mechanism pivotally mounts the links on the mount pieces in a manner to permit limited movement of the link ends in a slightly arcuate path with reciprocatory movement of the driven shaft.

3 Claims, 3 Drawing Figures

3,862,551

DRIVE SHAFT CONSTRUCTION FOR MIXERS AND THE LIKE

The present application is a continuation-in-part of my U.S. application Ser. No. 219,967, filed Jan. 24, 1972, now U.S. Pat. No. 3,802,278.

FIELD OF THE INVENTION

This invention relates to the transmission of mechanical power to output shafts which both reciprocate and rotate, and more particularly to a drive shaft construction with coupling members which transmit torque while moving relatively axially in a reciprocatory path. The invention finds particular use in driving the shafts of mixers having kneading screw flights of the type disclosed in U.S. Pat. Nos. 3,023,455 and 3,362,044.

BACKGROUND OF THE INVENTION

Continuous mixers of the type disclosed in the United States patents mentioned, provide interrupted flight kneading screws or worms which are reciprocated as well as rotated within a tubular mixing barrel having radially projecting lugs which cooperate with the interrupted flight members to achieve an intimate mixing or kneading of the substances being mixed. Since machinery for mixing relatively viscous ingredients quite often is necessarily large in size, relatively great forces are generated and it is important that the mechanism for coupling input and output shafts, in a manner to withstand the extremely heavy loads imposed, be constructed very sturdily so that distortion does not occur.

In U.S. Pat. No. 3,802,278 a splined coupling assembly was utilized to couple the input shaft to a shaft which was both rotated and reciprocated. While such splined assemblies have been utilized for some years, it has been determined that in heavy-duty mixers they tend to gall under the imposition of heavy loads, because of the difficulty of effectively lubricating them. Moreover, it has been determined that they wear relatively rapidly and, when worn, must be replaced by an entirely new assembly.

It is a primary object of the present invention to provide an improved coupling construction to mate with the reciprocation effecting mechanism disclosed in the application mentioned and obviate some of the problems encountered in the operation of such heavy-duty mixers.

It is another object of the invention to provide an improved torque transmitting coupling which allows lengthwise relative movement of its parts, while effectively transmitting driving power from a source, the coupling assembly being so designed and constructed as to be reliable and rugged, and capable of withstanding the imposition of the heavy loads to which it is subjected.

Still another object of the invention is to design an improved construction of the character indicated, wherein the parts which wear can be easily repositioned to expose alternate surfaces to wear, or easily replaced, when completely worn, without any necessity for replacement of the entire assembly.

A further object of the invention is to provide a simple, rugged construction of the type indicated which includes only a minimum number of parts which can be rapidly and economically fabricated and assembled.

Other objects and advantages of the present invention will become apparent to those of ordinary skill in the art as the description thereof proceeds.

SUMMARY OF THE INVENTION

Apparatus is provided for simultaneously rotating and axially reciprocating an output shaft such as a kneading screw, which includes: a drive shaft and an axially opposite co-axial driven shaft to which drive power is to be transmitted, mechanism mounting the driven shaft for reciprocation as well as rotation, pin mount surfaces on the sides of both the driven shaft and the drive shaft; links extending to pivotally connect the pin mount surfaces on the drive shaft and the driven shaft, and elements for pivotally mounting the links on the mount surfaces in a manner to permit limited movement of the link ends in a slightly arcuate path with reciprocatory movement of the driven shaft.

The present invention may more readily be understood by reference to the accompanying drawings, in which.

GENERAL DESCRIPTION

Figure 1:
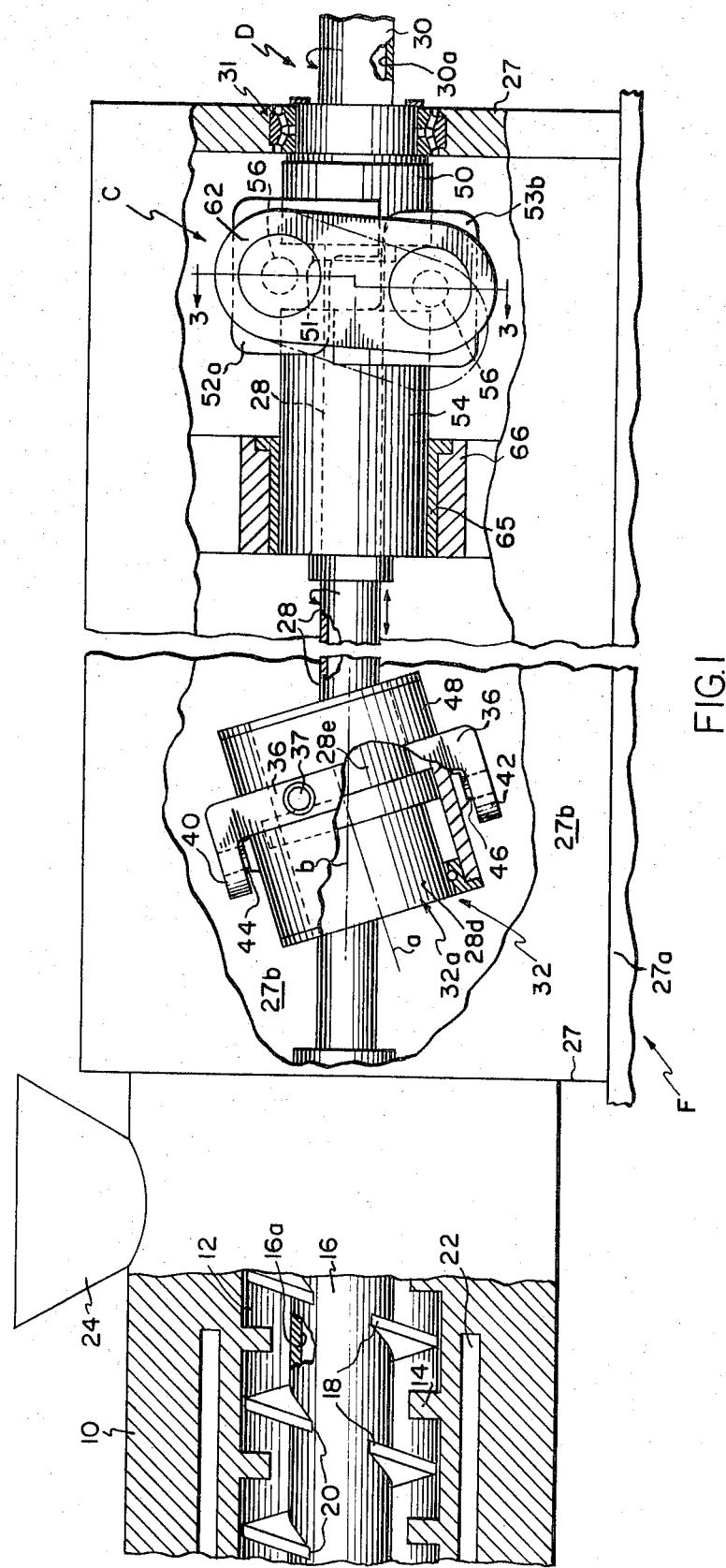
FIG. 1 is a partly sectional, side elevational view of a mixer assembly, with parts of the kneading screw housing, and the drive apparatus housing and certain drive parts, being broken away to more clearly illustrate the mechanism depicted.

Referring now more particularly to the accompanying drawings, the mixing apparatus depicted includes a tubular mixing barrel 10, defining an axially extending mixing or kneading chamber 12 which has axially spaced, radially extending lugs or teeth 14 extending radially into the chamber 12. Rotatably journaled in the barrel 10 is a tubular mixing shaft 16, having a plurality of worm blades or threads 18 which are interrupted at intervals, as indicated at 20, so as to permit reciprocation of the rotating shaft 16 without interference between the teeth 14 and the blades 18. A feed hopper 24 is attached to one end of the chamber 12 for delivering plastic or other material to be mixed in the mixer. Heat exchange compartments 22 may be provided in the mixing barrel 10, and a bore 16a may be provided in the shaft 16, through which suitable temperature control fluids, such as heat exchange mediums, may be circulated to control the temperature of the material being mixed in the chamber 12. Material extruding mechanisms, such as described in the patents mentioned, may be provided at the opposite end of the passage or chamber 12 in the usual manner.

Drive mechanism must be provided for both reciprocating and rotating the mixer shaft 16 and is accommodated within a drive housing generally indicated F having a base 27a, end walls 27, and side walls 27b. One of the end walls 27 may be removably connected to one end of the mixing barrel 10.

The mixer drive apparatus which is generally designated D, includes an input shaft 30 supported by a bearing 31 provided in the end wall 27 of the mixer drive housing which is remote from the mixer barrel 10. The input shaft 30 is rotatably driven by any suitable source of power, such as an electric motor, and may also be tubular in nature as at 30a to emit a heat exchange medium. A driven shaft 28 which both reciprocates and revolves is connected to the input shaft 30 via my improved coupling mechanism which I generally designate C, and which I will presently describe. As disclosed in my co-pending application, the shaft 28 is rotated by the shaft 30 and I provide a reciprocating movement producing assembly 32 for causing the shaft 28 to reciprocate as well as rotate. As my co-pending application, which I hereby incorporate by reference, discloses, the mechanism 32 includes an axially inclined portion generally designated 32a having equally eccentric portions 28d and 28e which are 180° out of phase with respect to the axis b of shaft 28 and input shaft 30. A yoke 48 is shaped to receive the crank portion 32a and includes a pair of trunnions 44 and 46 which are received by the bearing blocks 40 and 42 provided on a ring or second yoke member 36. The member has projecting trunnions 37 which are rotatably received in bearings provided on the housing side walls 27b. The trunnions 37 project at right angles to the trunnions 44 and 46, and a universal joint-like assembly is provided which reacts with the housing 26 to cause the rotated shaft 28 to be reciprocated. Consequently, the torque transmitted to coupling structure C by the input shaft 30, causes the shaft 28, and accordingly the shaft 16 to which it is coupled, to not only rotate but also to reciprocate. It will be readily apparent that the reciprocation and rotation will always be effected in timed relationship, and there will never be interference between the radially projecting lugs 14 and the kneading flights 18.

THE COUPLING STRUCTURE

Figure 2:
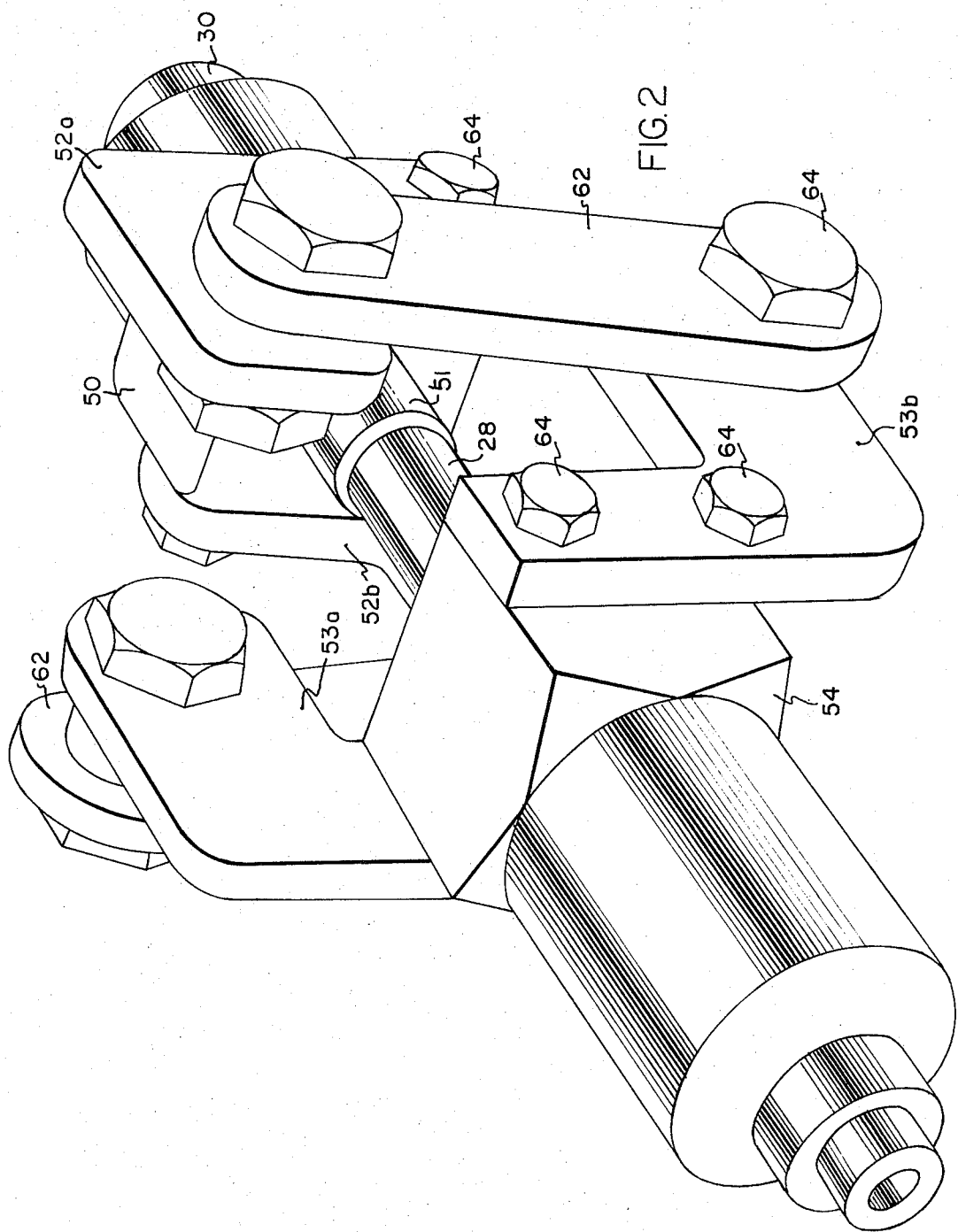
FIG. 2 is a schematic perspective view, particularly illustrating one form of drive coupling mechanism only.
Figure 3:
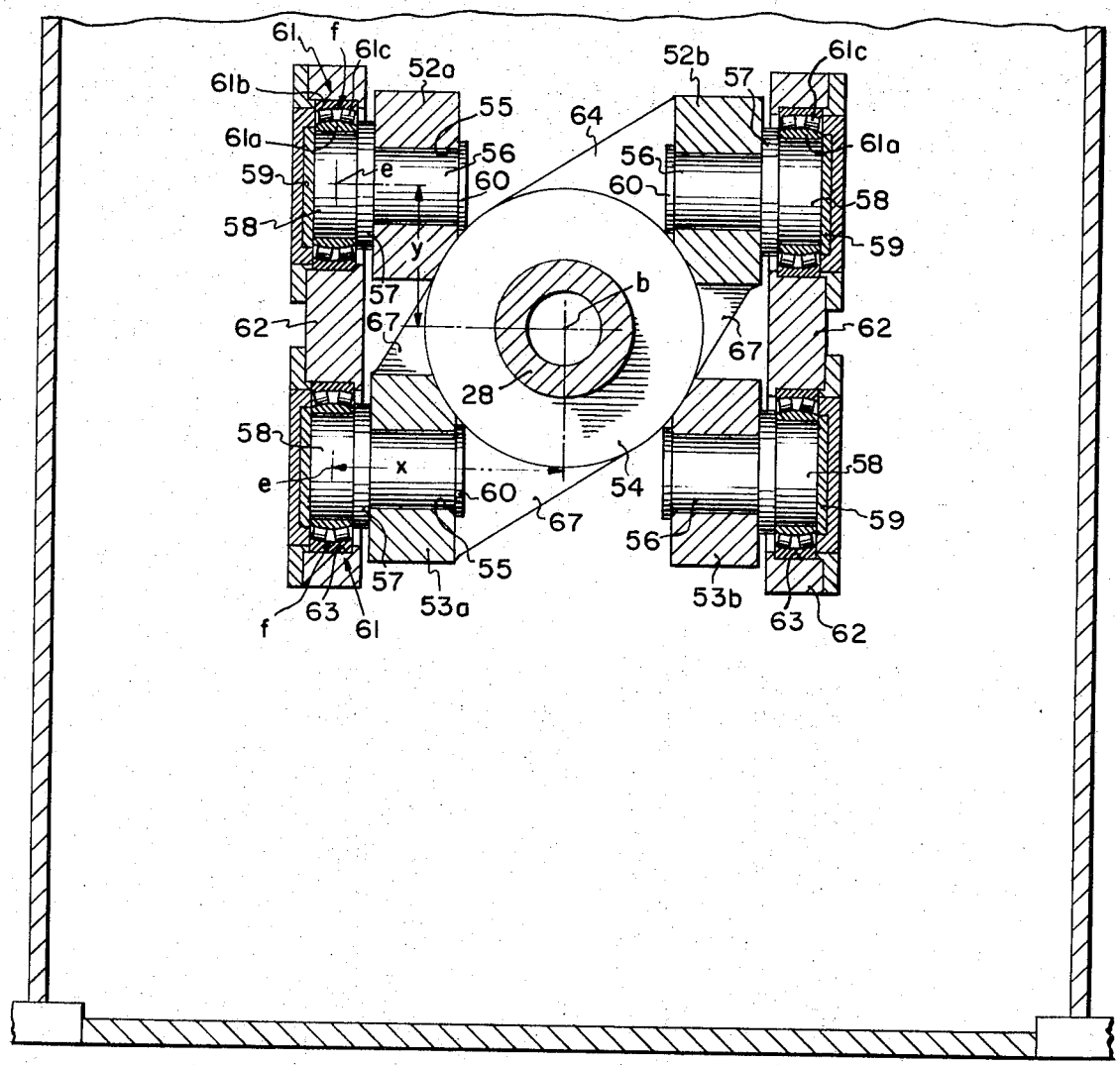
FIG. 3 is a transverse, sectional view taken on the line 3—3 of FIG. 1.

The coupling structure C which transmits the torque of input shaft 30 must do so in a manner to permit reciprocation of the driven shaft 28. FIGS. 2 and 3 more particularly illustrate the coupling structure C.

As FIG. 2 indicates, a hub 50 may be integrally provided on the input shaft 30 and this assembly may be provided with a slide bearing sleeve 51 for telescopically receiving the terminal end of shaft 28 which must reciprocate within the sleeve portion 51. An identically formed, but oppositely disposed pair of angle-shaped mount pieces 52a and 52b are provided on each side of the block 50, as shown. A like pair of angle-shaped mount pieces 53a and 53b which are also relatively oppositely disposed, is provided on the hub 54 which is integrated with shaft 28. The oppositely disposed mount pieces 52a–52b and 53a–53b extend in parallel planes, and it will be noted that the mount pieces 52a–53b and 52b–53a are in coplanar relationship.

Each of the mount pieces 52a, 52b, 53a, and 53b is provided with a bore 55 for receiving a trunnion 56 (see FIG. 3) which includes a shoulder portion 57 and an enlarged link mounting portion 58. Inner and outer securing members 59 and 60, respectively, are provided for securing the pins or trunnions 56 in position. The portions 58 are received in self-aligning roller bearing assemblies, generally designated 61, which include inner race members 61a and outer race members 61b, separated by cylindrical roller bearings 61c. Parallel connecting links 62 have openings 63 for receiving the outer races 61b. The links 62 extend in parallel planes and the axes of pins 56 are spaced an equal y coordinate distance (see FIG. 3) from the axis b. Likewise, the axes e of the laterally curvilinear bearing races 61a and 61b of the bearings 61 provided for pin surfaces 58 (see FIG. 3) are spaced an equal x coordinate distance from the axis b. Since the points of application of torque are removed from the axis b in both the x and y coordinate direction, a substantial moment arm is provided for transmitting torque from the continuously rotating shaft 30 to the shaft 28. The direction of rotation of shaft 30 is such that the transmission of torque places the links 62 in tension. A slide bushing 65 may be provided on frame part 66 to aid in journaling hub 54.

In operation, the links 62 at one limit of movement of the continuous reciprocatory stroke of shaft 28 are in nearly a vertical or perpendicular relationship with the axis b (see FIG. 1) and the torque is applied in a direction substantially perpendicular to axis b. The rotation of shaft 30 is then also applied to the mount pieces 53a and 53b, via links 62, as the mount pieces 53a and 53b are moving away from the mount pieces 52a and 52b and links 62 become more inclined with respect to the axis b. Because the lower ends of links 62, which are moving away from mount pieces 52a and 52b in FIG. 2, move in a slightly arcuate path relative to axis b, rather than in linear path exactly parallel with axis b, the lower ends of links 62 will tend to be forced laterally outwardly on the pins 58 relative to the plane of links 62, and this will tend to move the upper ends of links 62 in reaction laterally inwardly out of the normal, unstressed plane of movement of links 62. A limited lateral movement of the ends of the link in the nature of less than a 64th of an inch is permitted by the curvilinear races 61a, 61b when the stroke of the shaft 28 is, for example, in the neighborhood of 1⅞ inches. Of course, with extended operation of the mixer, wear will occur, particularly at the points f in FIG. 3. When, more than an acceptable wear of these hardened steel parts occurs with long usage of the equipment, it is a relatively simple matter to rotate the bearings 61 through 180° to present new wear surfaces to the links 62. Similarly, when the rotated surfaces become unacceptably worn, it is a simple matter to simply replace any bearing 61 without any necessity of replacing the entire assembly. The longer the links 62, the less arcuate is the path of movement of the ends of links 62.

It is to be understood that the lateral relative rocking movement described is actually slight and self-aligning because of the lateral curvilinearity of the bearings 61. Preferably, only two 180° apart links which extend in parallel planes are employed, to keep the coupling devices as compact as possible, and avoid the imposition of dynamically unbalanced radial bearing loads. Of course, on the return of shaft 28 toward the shaft 30, the links 62 assume a less inclined position and lateral bearing play is progressively less as the links 62 assume a more vertical, or more perpendicular position, relative to axis b. Plainly, the mount pieces 52a, 52b, 53a, and 53b may be bolted to the shaft parts 50 and 54 respectively as at 64 or cast with connecting sections 65 which integrate them with the parts 50 and 54 as FIGS. 1 and 3 illustrate.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. A rotary drive coupling for transmitting rotation between a pair of coaxially aligned shafts while one of said shafts is driven in axial reciprocation relative to the other between spaced end limits, said coupling comprising a pair of mounting means each adapted to be fixedly mounted upon the respective shafts, a pair of pivot means on each of said mounting means, the pivot means on each mounting means being located on opposite sides of and equally spaced from a first plane containing the common axis of said shafts and being equally spaced from a second plane containing the common axis of said shafts and perpendicular to said first plane, and a pair of rigid links, each link being pivotally coupled at one end to a pivot means on one mounting member and pivotally coupled at its opposite end to the pivot means of the other mounting member on the same side of said first plane as said one end of said link, said pivot means supporting said links for movement in general planes parallel to said first plane at opposite sides thereof.

2. The invention defined in claim 1, wherein said pivot means define axes of pivotal movement lying in pivot planes normal to said one of said mutually perpendicular planes and accommodate tilting movement of the pivot axis within the pivot plane.

3. The invention defined in claim 2 wherein said pivot axes lie in a common pivot plane perpendicular to both of said mutually perpendicular planes when said shafts are midway between said opposite end limits.

* * * * *